United States Patent
Becke et al.

[15] 3,682,941
[45] Aug. 8, 1972

[54] PRODUCTION OF 1,2-BENZOISOTHIAZOLES

[72] Inventors: Friedrich Becke, Heidelberg; Helmuth Hagen, Ludwigshafen/Rhine, both of Germany

[73] Assignee: Badische Anilin- & Soda-Fabrik Aktiengesellschaft, Ludwigshafen/Rhine, Germany

[22] Filed: Oct. 15, 1970

[21] Appl. No.: 81,175

Related U.S. Application Data

[63] Continuation of Ser. No. 712,928, March 14, 1968, abandoned.

[30] Foreign Application Priority Data

March 18, 1967 Germany..........P 16 70 196.5

[52] U.S. Cl.................................260/304, 260/651

[51] Int. Cl..............................................C07d 91/12
[58] Field of Search......................................260/304

[56] References Cited

UNITED STATES PATENTS 3,254,094   5/1966   Ross........................260/304

*Primary Examiner*—Alex Mazel
*Assistant Examiner*—R. J. Gallagher
*Attorney*—Johnston, Root, O'Keeffe, Keil, Thompson & Shurtleff

[57] ABSTRACT

Production of 1,2-benzoisothiazoles by reacting dihalomethylaryl compounds with ammonia and elementary sulfur. The products are valuable starting materials for the production of dyes, rubber auxiliaries and oxidation inhibitors.

6 Claims, No Drawings

PRODUCTION OF 1,2-BENZOISOTHIAZOLES

This is a continuation of U.S. Pat. Application Ser. No. 712,928, filed on Mar. 14, 1968, and now abandoned.

This invention relates to the production of 1,2-benzoisothiazoles by reaction of dihalomethylaryl compounds with ammonia and elementary sulphur.

It is known from Angew. Chem., 36, 159 (1923) and from Ber., 58, 2095 (1925) that thionaphthene-2,3-dione can be reacted with ammonia and hydrogen peroxide to form 3-carbamyl-1,2-benzoisothiazole from which 1,2-benzoisothiazole can be obtained by hydrolysis and decarboxylation. Ber., 56, 1630 (1923) and Ann., 454, 264 (1927) describe the reaction of 2-formyl-4-nitrophenylsulfenyl bromide with ammonia to form 5-nitro-1,2-benzoisothiazole. Benzisothiazoles can also be synthesized by cyclization of 0-mercaptophenylcarbonyl compounds in the presence of polyphosphoric acids (Annali di Chimica, volume 53, number 5, pages 577 to 587 (1963)).

It is an object of this invention to provide a new process for the production of 1,2-benzoisothiazoles, starting from easily accessible starting materials, in good yields and in a simple way.

This and other objects of the invention are achieved and 1,2-benzoisothiazoles having the general formula:

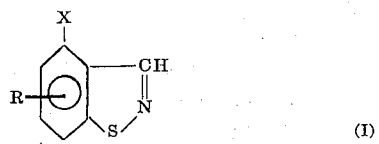

in which X denotes a halogen, R denotes hydrogen, an aliphatic, cycloaliphatic, aromatic or anellated aromatic radical, halogen, an alkoxy group or a nitro group are obtained by reacting with ammonia and elementary sulfur a dihalomethylaryl compound having the general formula:

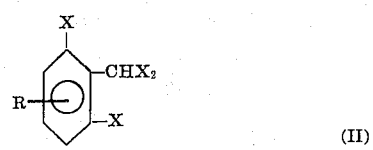

in which X and R have the above meanings. The halogen atoms denotes by X may be identical or different.

Taking the reaction of 2,6-dichlorobenzal chloride with ammonia and sulfur as an example, the reaction proceeds in accordance with the following equation:

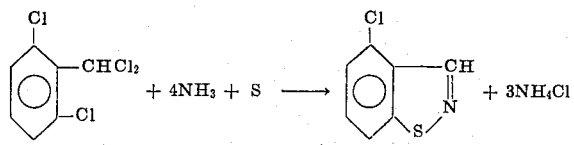

Since both chlorine atoms in o-position to the dihalomethyl group are reactive, the isothiazole ring may also close onto the opposite o-position; in the case of appropriately substituted substances (II), mixtures of the two corresponding benzoisothiazoles may be obtained.

As compared with the abovementioned prior art methods, the process according to this invention starts from more easily accessible starting materials and gives better yields of 1,2-benzoisothiazoles.

Preferred starting materials (II), and consequently preferred 1,2-benzoisothiazoles (I), are those in whose formulas X denotes a chlorine atom and R denotes an alkyl radical having one to six carbon atoms, a cycloalkyl radical having five to 12 carbon atoms, a phenyl radical or naphthyl radical (which in each case may also be anellated), a hydrogen atom, a chlorine atom, an alkoxy group having one to four carbon atoms or a nitro group.

The starting material (II), ammonia and elementary sulfur may be used in about stoichiometric amounts but ammonia is preferably used in excess. In general a temperature of from 50° to 200° C preferably from 100° to 150° C, is used. The reaction pressure is determined by the total vapor pressure of the components at the reaction temperature. Solvents which are inert under the reaction conditions, such as aromatic hydrocarbons, for example benzene, or alcohols, for example methanol, or ethers, may be used in the reaction if desired.

The reaction may be carried out as follows:

The substance (II), elementary sulfur and ammonia are reacted together, in the presence or absence of a solvent, in a pressure reactor for about five to ten hours at the said temperature. The reaction mixture is then filtered and the filter cake is washed with benzene. 1,2-benzoisothiazole is obtained from the combined filtrates by a conventional method, for example by fractional distillation followed by recrystallization from ligroin. The reaction mixture may also be poured into water, after excess ammonia has been removed, the resultant mixture extracted with benzene and the extract worked up in the manner described.

Compounds prepared according to the process of the invention are valuable starting materials for the production of dyes, rubber auxiliaries and oxidation inhibitors. For example by reaction of the products with sulfur at about 180° C mercaptobenzoisothiazoles can be prepared which are valuable vulcanization accelerators (thiazole accelerators). Reference is made to W. Hofmann, Vulkanisation und Vulkanisationshilfsmittel, Verlag Berliner Union GmbH, 1965, for information concerning the use of thiazole accelerators.

The invention is illustrated by the following Examples in which the parts specified are parts by weight.

EXAMPLE 1

115 parts of 2,6-dichlorobenzal chloride, 16 parts of sulfur and 60 parts of ammonia in 125 parts of benzene are heated for 6 hours at 150° C in a tentalum autoclave. The pressure is released, the discharge from the autoclave is filtered and the filter cake washed with 200 parts of hot benzene. The filter cake is ammonium chloride. The combined filtrates are freed from benzene and then fractionated under subatmospheric pressure. At a boiling point of 95° to 100° C at 2 mm, 61 parts of a crystallizing compound is obtained which has a melting point of 45° C after it has been recrystallized from ligroin. It is identified as 4-chloro-1,2-benzoisothiazole. The yield with reference to 2,6-dichlorobenzal chloride is 72 percent of the theory.

Analysis: calculated: C 49.6% H 2.3% N 8.2% Cl 21.0% S 18.9%
found: C 49.8% H 2.3% N 7.9% Cl 21.1% S 18.6%.

EXAMPLE 2

132 parts of 2,3,6-trichlorobenzal chloride, 16 parts of sulfur and 60 parts of ammonia in 125 parts of benzene are heated for 5 hours at 140° C in a tantalum autoclave. The discharge from the autoclave is freed from ammonia, the ammonium chloride formed is filtered off and the benzene solution is fractionated. 74 parts of a distillate is obtained at 130° to 135° C at 3 mm; this solidifies and has a melting point of 76° to 81° C after it has been recrystallized from ligroin. On the basis of gas chromatographic separation, it is a mixture of 4,5-dichloro-1,2-benzoisothiazole and 4,7-dichloro-1,2-benzoisothiazole in about equal parts. The yield is 72.5 percent of the theory with reference to the 2,3,6-trichlorobenzal chloride used.

Analysis: calculated: C 41.2% H 1.5% N 6.9% S 15.6% Cl 34.8%
found: C 41.0% H 1.7% N 6.5% S 15.8% Cl 34.5%.

EXAMPLE 3

115 parts of 2,6-dichlorobenzal chloride, 16 parts of sulfur and 90 parts of ammonia in 200 parts of methanol are heated for 10 hours at 120° C in a tantalum autoclave. The pressure is released and the discharge from the autoclave is poured into 500 parts of water and extracted with benzene. The benzene solution is dried, concentrated and distilled in an oil pump vacuum. 68 parts of 4-chloro-1,2-benzoisothiazole is obtained at a boiling point of 95° C at 2 mm, i.e. 80 percent of the theory with reference to 2,6-dichlorobenzal chloride.

The invention is hereby claimed as follows:

1. A process for the production of 1,2-benzoisothiazoles having the formula:

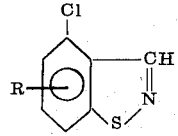

in which R denotes a hydrogen atom or chloro, which comprises reacting at 100°–150° C a dihalomethylaryl compound having the formula:

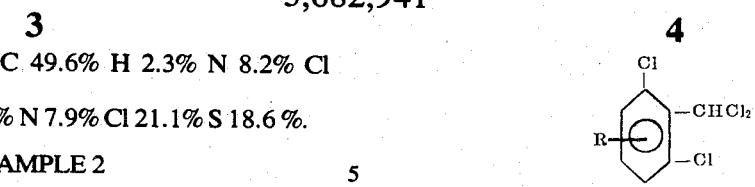

in which R has the above meaning with ammonia and elementary sulfur in about stoichiometric amounts in an inert organic solvent at superatmospheric pressure resulting from the total vapor pressure of the components of the reaction mixture at the reaction temperature.

2. A process as claimed in claim 1 wherein said dihalomethylaryl compound is 2,6-dichlorobenzal chloride.

3. A process as claimed in claim 1 wherein said dihalomethylaryl compound is 2,3,6-trichlorobenzal chloride.

4. A process as claimed in claim 1 wherein said solvent is an aromatic hydrocarbon, an alcohol or an ether.

5. A process as claimed in claim 1 wherein ammonia is employed in excess of its stoichiometric amount.

6. A process for the production of 1,2-benzoisothiazoles having the formula:

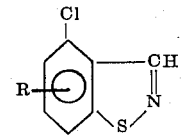

in which R denotes a hydrogen atom or chloro, which comprises reacting in an autoclave at 120–150° C a dihalomethylaryl compound having the formula:

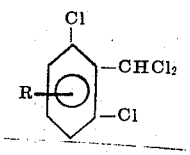

in which R has the above meaning with ammonia and elementary sulfur in about stoichiometric amounts in, as the inert solvent, benzene or methanol.

* * * * *